US009881116B2

(12) United States Patent
Chen et al.

(10) Patent No.: US 9,881,116 B2
(45) Date of Patent: Jan. 30, 2018

(54) RESTRICTED REGION TRANSFORM METHOD AND RESTRICTED REGION TRANSFORM DEVICE

(71) Applicants: Inventec (Pudong) Technology Corporation, Shanghai (CN); INVENTEC CORPORATION, Taipei (TW)

(72) Inventors: Cheng-Hsin Chen, Taipei (TW); Chun-Hong Lin, Taipei (TW); Chun-Chieh Chen, Taipei (TW); Cheng-Hsiang Huang, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 22 days.

(21) Appl. No.: 15/152,679

(22) Filed: May 12, 2016

(65) Prior Publication Data
US 2017/0154146 A1    Jun. 1, 2017

(30) Foreign Application Priority Data
Nov. 30, 2015    (CN) .......................... 2015 1 0854895

(51) Int. Cl.
*G06F 17/50* (2006.01)
*H05K 3/00* (2006.01)

(52) U.S. Cl.
CPC ....... *G06F 17/5072* (2013.01); *H05K 3/0005* (2013.01); *G06F 2217/06* (2013.01)

(58) Field of Classification Search
CPC ...................................................... G06F 17/50
USPC ......................................................... 716/137
See application file for complete search history.

(56) References Cited

U.S. PATENT DOCUMENTS

2003/0229882 A1\*    12/2003    Ludwig ..................... G03F 1/30
716/52

\* cited by examiner

*Primary Examiner* — Thuan Do
(74) *Attorney, Agent, or Firm* — Maschoff Brennan (57) ABSTRACT

A restricted region transform method and a restricted region transform device are disclosed. The method includes following steps: reading out bare board information of a printed circuit board and layout information of a plurality of components, wherein the layout information of the plurality of components corresponds to a plurality of physical restricted regions; setting a first region according to edge information in the bare board information; setting a plurality of second regions according to projections of the plurality of physical restricted regions on a surface of the printed circuit board; selecting every two second regions, which overlap each other, among the plurality of second regions, and the selected second regions constituting a restriction conflict set; and selectively amending the second regions in the restriction conflict set to remove one or more overlaps from the second regions in the restriction conflict set.

10 Claims, 11 Drawing Sheets

RESTRICTED REGION TRANSFORM METHOD AND RESTRICTED REGION TRANSFORM DEVICE

CROSS-REFERENCE TO RELATED APPLICATIONS

This non-provisional application claims priority under 35 U.S.C. §119(a) on Patent Application No(s). 201510854895X filed in China on Nov. 30, 2015, the entire contents of which are hereby incorporated by reference.

BACKGROUND

Technical Field

The disclosure relates to a restricted region transform method and a restricted region transform device, more particularly to a restricted region transform method and a restricted region transform device under the electronic computer-aided design (ECAD) rules.

Related Art

Figure 1:
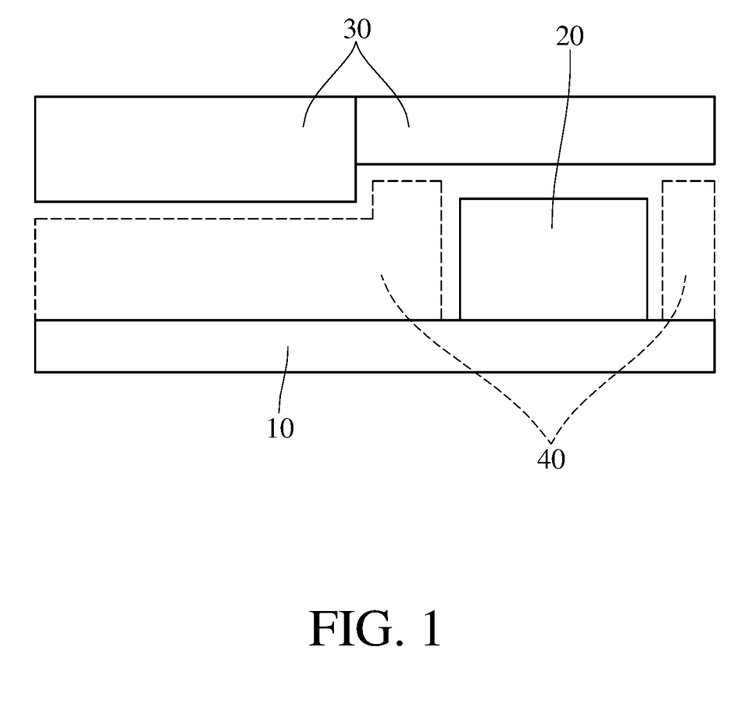
FIG. 1 is a schematic view of the conventional arrangement of a bare board, members and electronic components.

In the art, mechanical engineering research designers (MERDs) should consider the space planning in their design of printed circuit boards (PCBs), in order to avoid any conflict between the disposition of electronic components and the disposition of other designed elements. For this, as shown in FIG. 1, some electronic components 20 are disposed on the PCB bare board 10 before the restricted region 40 in which electrical engineering research designers (EERDs) will dispose other electronic components, is planed based on the remaining space among the members 30 (i.e. the models, such as the upper and lower covers of the casing, designed by the mechanical engineering research designer) and the PCB bare board 10.

The most software, e.g. Allegro, used by electrical engineering research designers cannot directly learn the restricted regions for electronic components, defined by mechanical engineering research designers, so the mechanical engineering research designers have to establish these restricted regions according to the ECAD rules in advance. Accordingly, the electrical engineering research designers can use their software to directly read out the information about the restricted regions for electronic components.

Figure 2:
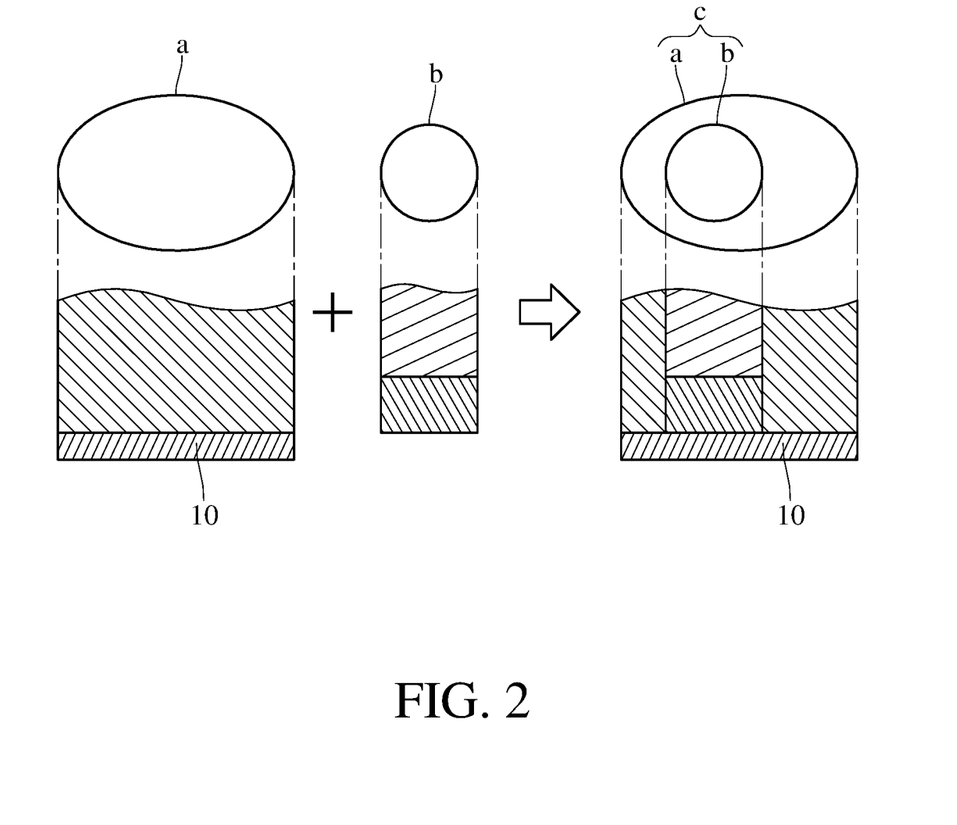
FIG. 2 is a schematic view of a conventional process of establishing an ECAD restricted region.

For example, in view of the process of establishing an ECAD restricted region as shown in FIG. 2, the mechanical engineering research designer has to establish the Place Keepin region a by tracing out the edge of the PCB bare board 10, and to establish the Place Keepout region b in which any electronic component shall not be disposed, according to the heights of the restricted regions in which electronic components will be disposed, before establishing the ECAD restricted region c for electrical engineering research designers to read out.

Figure 3:
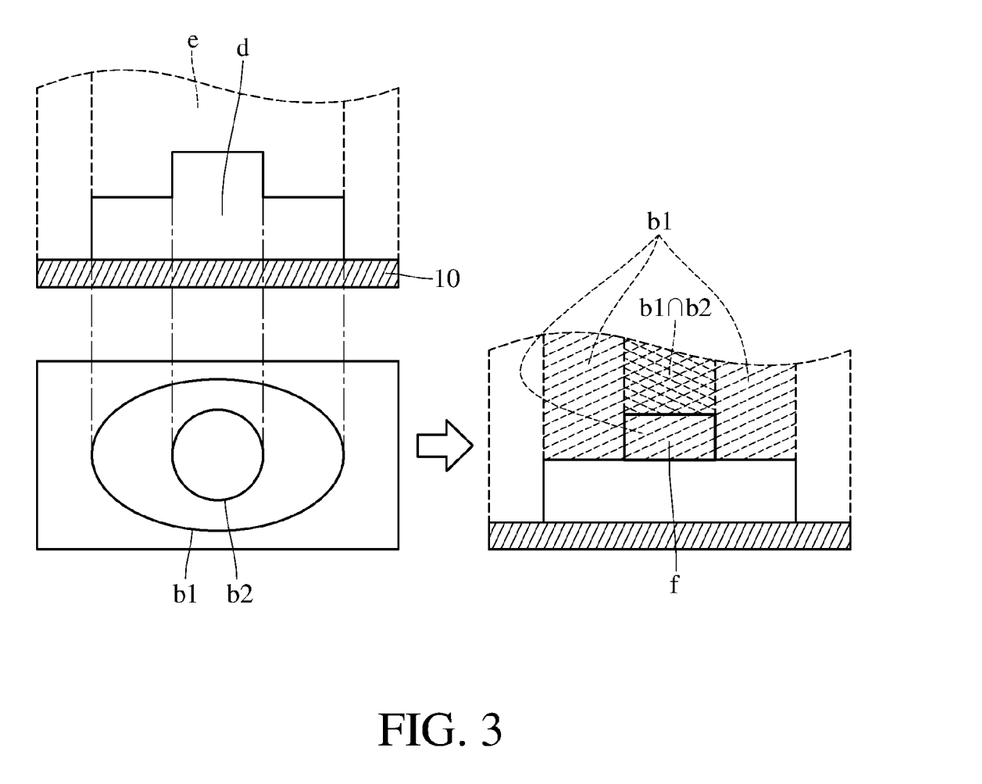
FIG. 3 is a schematic view of the conflict regions between the physical restricted regions having different heights in the art.

However, in view of the conflict regions between the physical restricted regions having different heights in FIG. 3, while the region d for an electronic component has various heights, the region e, in which any electronic component shall not be disposed, will also has various heights, as shown in the Place Keepout regions b1 and b2. When the Place Keepout region b1 overlaps the Place Keepout region b2, the conflict region f will form under the intersection b1∩b2 between the Place Keepout regions b1 and b2. In other words, the conflict region f represents the region d, which is covered by the Place Keepout region b1 and in which an electronic components will be disposed.

Accordingly, if one or more conflict regions appear between the physical restricted regions having different heights, the above conventional method of establishing restricted regions requires a great deal of labor and time costs to process the one or more conflict regions.

SUMMARY

In view of the above description, the disclosure provides a restricted region transform method and a restricted region transform device to resolve the above problems in the art.

According to an embodiment, the disclosure provides a restricted region transform method including the following steps: reading out bare board information of a printed circuit board and layout information of a plurality of components, wherein the layout information of the plurality of components corresponds to a plurality of physical restricted regions; setting a first region according to edge information in the bare board information; setting a plurality of second regions according to projections of the plurality of physical restricted regions on a surface of the printed circuit board; selecting the second regions, which have an overlap therebetween, among the plurality of second regions, and the selected second regions constituting a restriction conflict set; and selectively amending the second regions in the restriction conflict set to remove the overlap between every two second regions in the restriction conflict set.

In another embodiment, the above restricted region transform method further includes the following steps: selecting a first conflict region from the second regions in the restriction conflict set and selecting at least one second conflict region in the first conflict region; amending edge of the first conflict region to become an inwardly-shrunk edge, which comprising an outer edge, an inner edge and a bridge edge connecting to the outer edge and the inner edge, wherein the outer edge is a part of the edge of the first conflict region that has not been amended, and the inner edge is close to and is outside an edge of the at least one second conflict region; and removing the first conflict region that is amended, from the restriction conflict set and repeating the above steps.

In yet another embodiment, in the first conflict region, the at least one second conflict region is smaller than the first conflict region merely.

In yet another embodiment, wherein the edge of the first conflict region and the edge of the at least one second conflict region have no injection therebetween. That is, the edge of the first conflict region does not overlap the edge of the at least one second conflict region.

In yet another embodiment, when the amount of the at least one second conflict region is plural, the second conflict regions are separated from each other.

In yet another embodiment, when the amount of the at least one second conflict region is plural, the edges of the second conflict regions have an injunction therebetween.

In yet another embodiment, the above restricted region transform method further includes a step: combining the first region and the plurality of second regions into an ECAD restricted region.

According to an embodiment, the disclosure provides a restricted region transform device including an information capturing module, a region setting module and a conflict resolution module. The region setting module is coupled to the information capturing module and the conflict resolution module. The information capturing module reads out bare board information of a printed circuit board and layout information of a plurality of components. The layout information of the plurality of components corresponds to a plurality of physical restricted regions. The region setting module sets a first region according to edge information in the bare board information and sets a plurality of second regions according to projections of the plurality of physical restricted regions on a surface of the printed circuit board. The conflict resolution module selects the second regions which have an overlap therebetween, from the plurality of second regions. The selected second regions constitute a restriction conflict set. The conflict resolution module selectively amends the second regions in the restriction conflict set to remove the overlap between every two second regions in the restriction conflict set.

As described above, the disclosure uses the projections of physical restricted regions on the surface of the printed circuit board to define second regions, and one by one amends the second regions in the restriction conflict set, in which one or more overlaps exist, from the outermost part to the innermost part, so as to remove any overlap from the second regions. Therefore, one or more conflict regions may automatically be removed from a region in which an electronic component will be disposed.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 4:
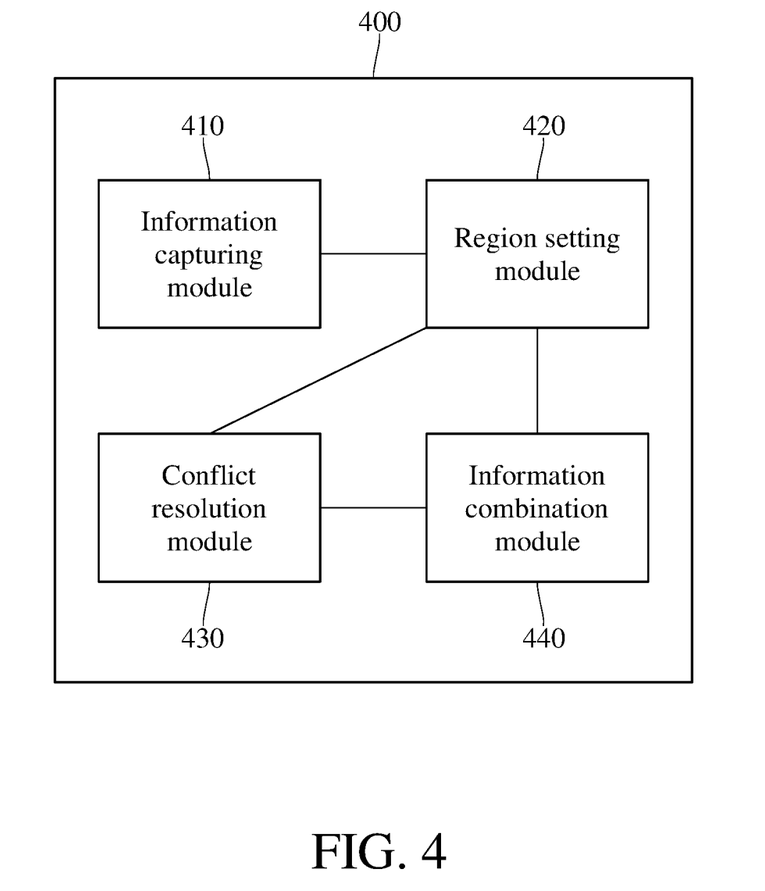
FIG. 4 is a block diagram of a restricted region transform device in an embodiment.

FIG. 4 is a block diagram of a restricted region transform device 400 in an embodiment. The restricted region transform device 400 includes an information capturing module 410, a region setting module 420, a conflict resolution module 430 and an information combination module 440. The region setting module 420 is coupled to the information capturing module 410, the conflict resolution module 430 is coupled to the region setting module 420, the information combination module 440 is coupled to the region setting module 420 and the conflict resolution module 430. The restricted region transform device 400 is, for example, a personal computer, a server, a portable mobile device, or other types of electronic device. The information capturing module 410, the region setting module 420, the conflict resolution module 430 and the information combination module 440 are, for example, embodied with varieties of chips or microprocessors. The disclosure is not restricted to the above instances.

Figure 5:
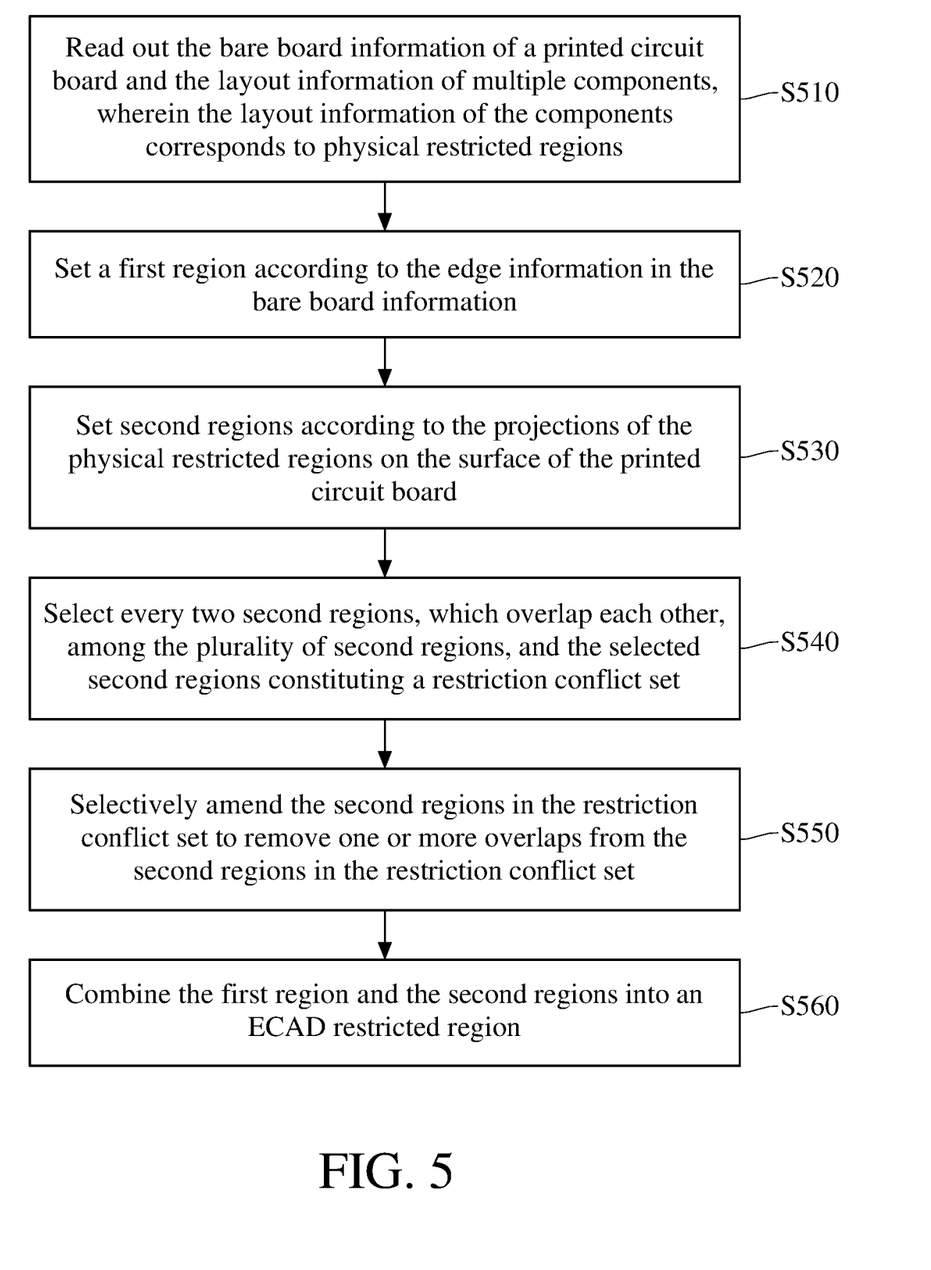
FIG. 5 is a flow chart of a restricted region transform method in an embodiment.
Figure 6:
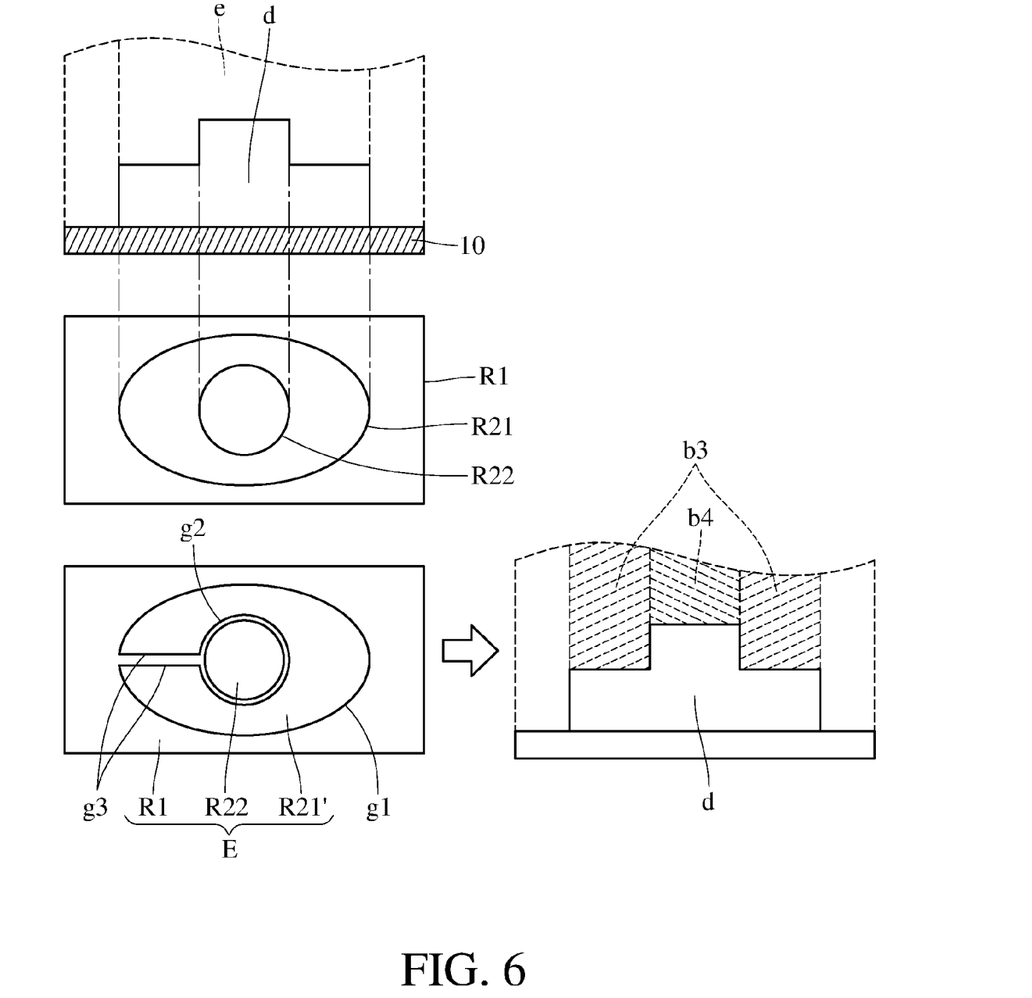
FIG. 6 is a schematic view of removing the conflict regions between the physical restricted regions having different heights in an embodiment.
Figure 7A:
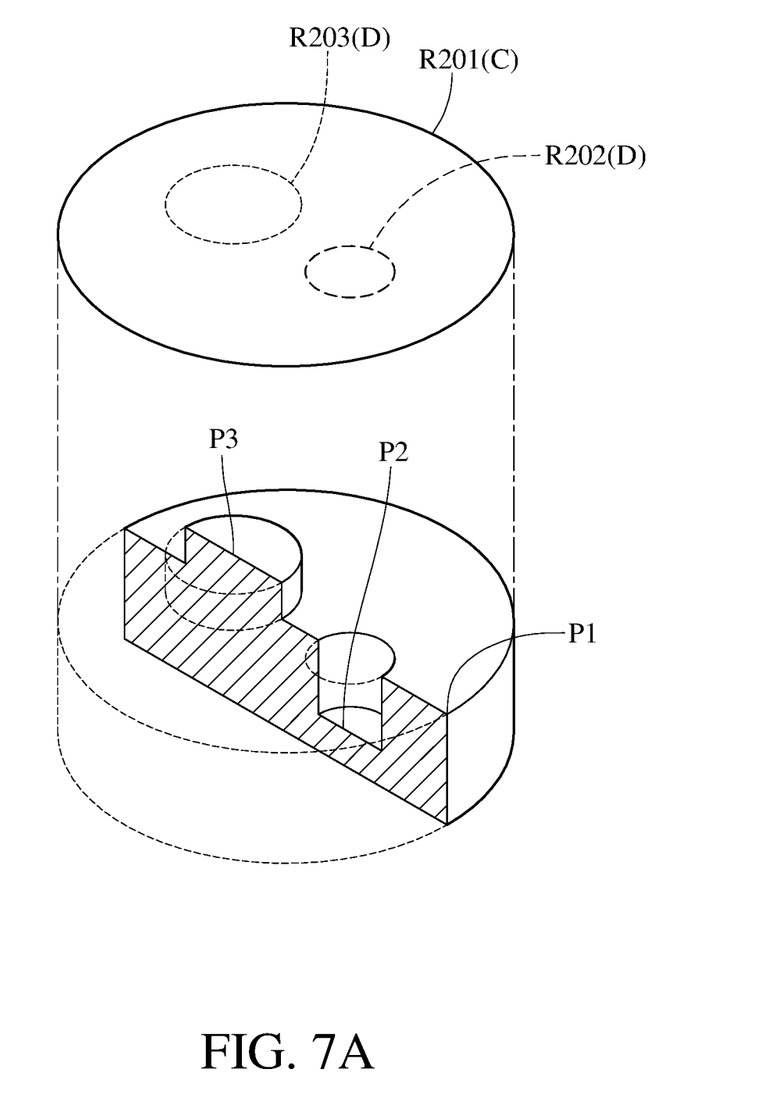
FIGS. 7A-7C schematically illustrate the physical restricted regions, the relevant projections, the selected first conflict region and the selected second conflict region.
Figure 7B:
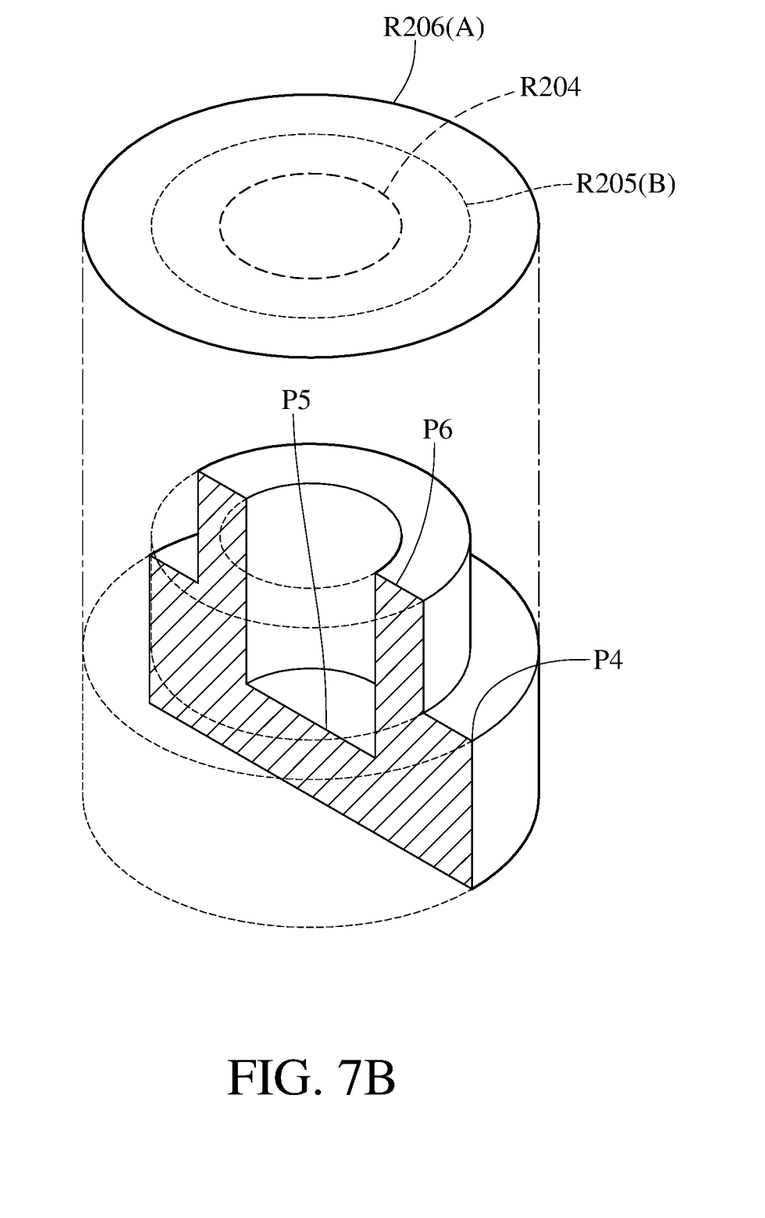
Figure 7C:
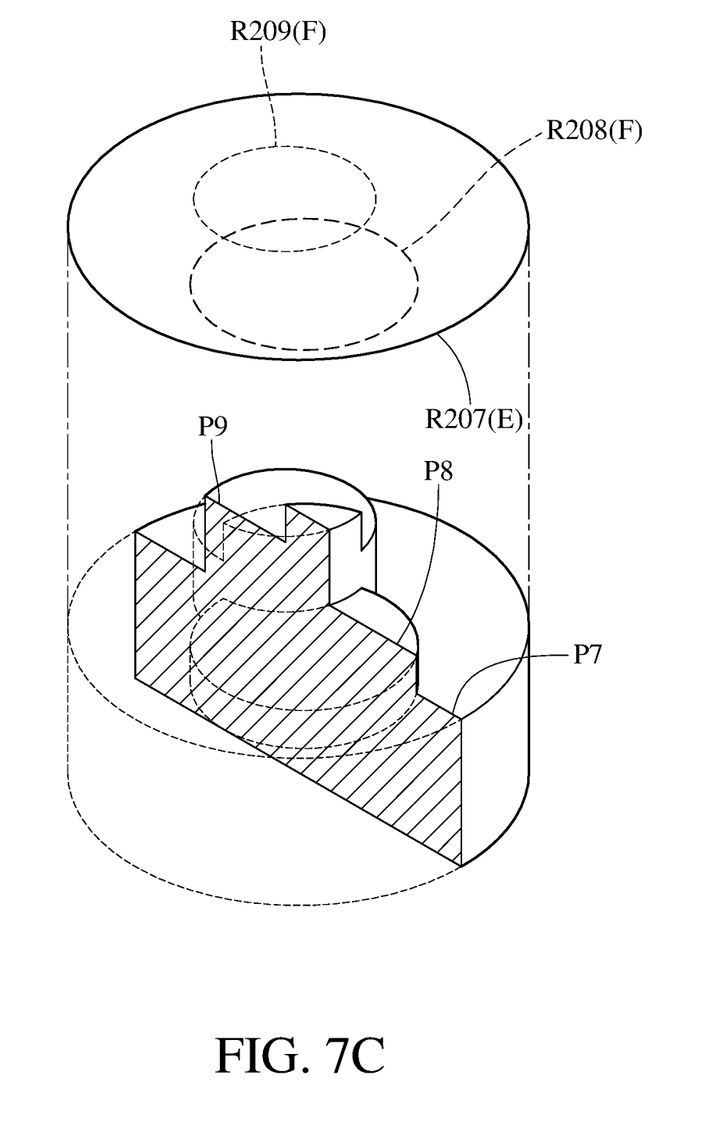

Please refer to FIG. 4, FIG. 5, FIG. 6 and FIGS. 7A-7C to illustrate the operation of the restricted region transform device 400. FIG. 5 is a flow chart of a restricted region transform method in an embodiment; FIG. 6 is a schematic view of removing the conflict regions between the physical restricted regions having different heights in an embodiment; and FIGS. 7A-7C schematically illustrate the physical restricted regions, the relevant projections, the selected first conflict region and the selected second conflict region. The restricted region transform method includes steps S510~S560.

In step S510, the information capturing module 410 reads out the bare board information of a printed circuit board and the layout information of multiple components. The layout information of components corresponds to multiple physical restricted regions. For example, as shown in FIGS. 7A-7C, each of the physical restricted regions P1~P10 corresponds to the layout information of an electronic component.

In step S520, the region setting module 420 sets a first region according to the edge information in the bare board information. For example, as shown in FIG. 6, the region setting module 420 sets the first region R1 according to the edge information of the bare board 10. In other words, the first region R1 corresponds to a Place Keepin region.

In step S530, the region setting module 420 sets multiple second regions according to the projections of the physical restricted regions on the surface of the printed circuit board. For example, as shown in FIGS. 7A~7C, the region setting module 420 sets the second regions R201~R210 according to the projections of the physical restricted regions P1~P10. Moreover, a second region corresponds to a height limitation (i.e. Place Keepout region). That is, the second region indicates that any electronic component cannot be disposed at a position higher than a certain height in a certain region.

In step S540, the conflict resolution module 430 selects the second regions overlapping each other, from all the second regions, and the selected second regions constitute a restriction conflict set. For example, as shown in FIG. 6, the conflict resolution module 430 recognizes an overlap between the second regions R21 and R22 and sets the second regions R21 and R22 as a part of the restriction conflict set. Likewise, as shown in FIGS. 7A~7C, the conflict resolution module 430 recognizes any overlap among the second regions R201~R210 and sets every two second regions overlapping each other to be a fraction of the restriction conflict set.

In step S550, the conflict resolution module 430 selectively amends the second regions in the restriction conflict set to remove each overlap from the second regions in the restriction conflict set. For example, as shown in FIG. 6, the conflict resolution module 430 may amend the second region R21 in the restriction conflict set to produce a new second region R21', so the regions R21' and R22 have no overlap therebetween.

In step S560, the information combination module 440 combines the first region and the second regions into an ECAD restricted region. For example, as shown in FIG. 6, the information combination module 440 combines the first region R1 and the second regions R21' and R22 into an ECAD restricted region E. In this way, the conflict region (e.g. the conflict region f in FIG. 3) between the original related second regions R21 and R22 may be removed. In other words, the height limitation range (i.e. the Place Keepout regions b3 and b4) corresponding to the second regions R21' and R22 almost covers the entire region e, in which no electronic component cannot be disposed. In addition, the Place Keepout region b3 corresponding to the second region R21' does not overlap the region d, in which the electronic component will be disposed.

Figure 8:
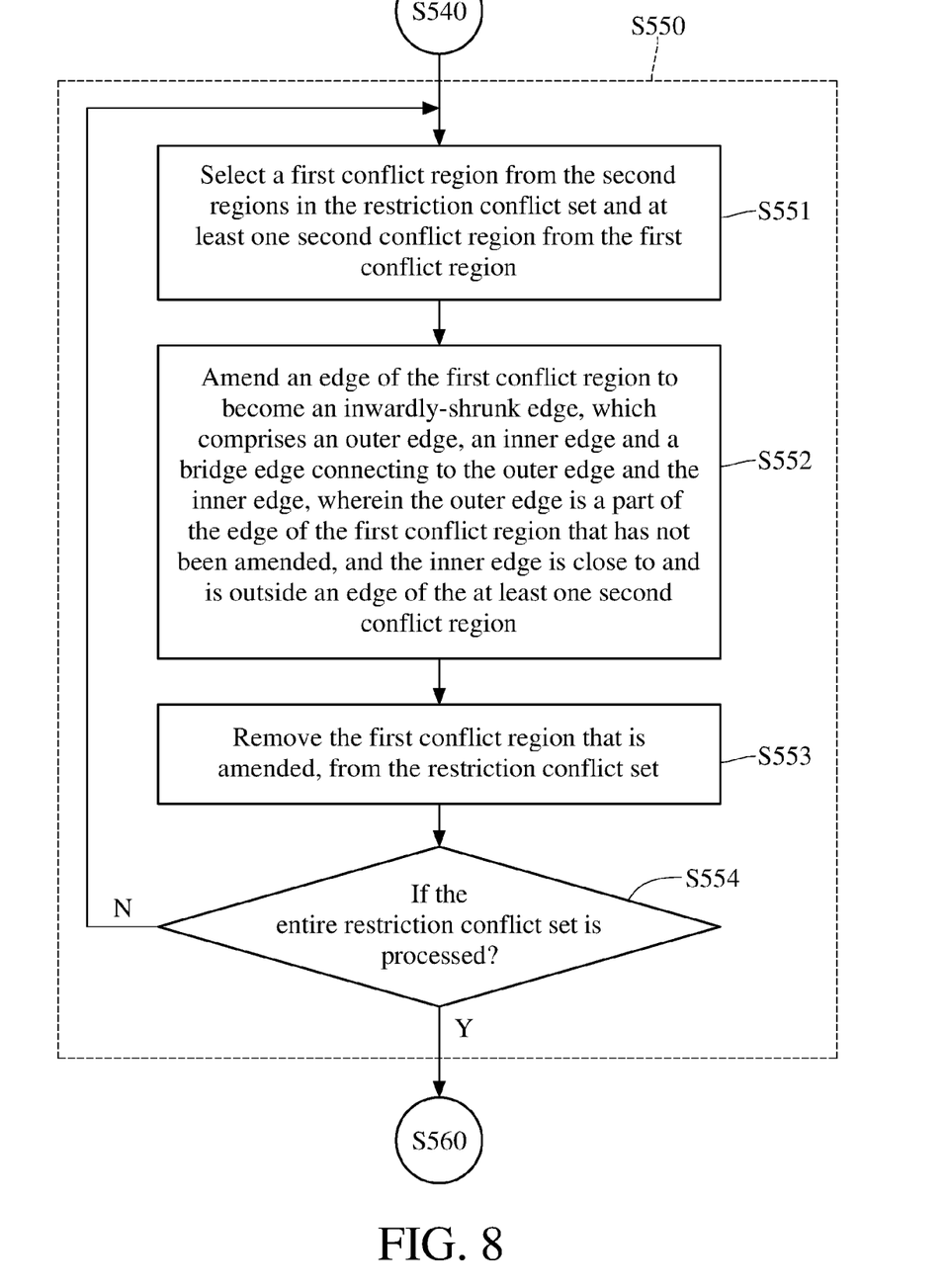
FIG. 8 is a flow chart of a restricted region transform method in another embodiment.

FIG. 8 is a flow chart of a restricted region transform method in another embodiment. The restricted region transform method includes steps S551~S554. Please refer to FIG. 4, FIG. 6, FIGS. 7A~7C and FIG. 8 to describe the method in detail.

In step S551, the conflict resolution module 430 further selects a first conflict region from the second regions in the above restriction conflict set, and at least one second conflict region from the first conflict region. For example, as shown in FIG. 6, the first conflict region R21 may include the second conflict region R22. In other words, the first conflict region R21 overlaps the second conflict region R22.

In step S552, the conflict resolution module 430 further amends the edge of the first conflict region to become an inwardly-shrunk edge including an outer edge, an inner edge and bridge edges. The bridge edges connect to the outer edge and the inner edge. The outer edge is a part of the edge of the first conflict region that has not been amended, and the inner edge is close to and is outside an edge of the at least one second conflict region. For example, as shown in FIG. 6, the first conflict region R21' that is amended, has an outer edge g1, an inner edge g2 and bridge edges g3 connecting to the outer edge g1 and the inner edge g2. Therefore, the first conflict region R21' does not overlap the second conflict region R22. In FIG. 6, the inner edge g2 and the edge of the second conflict region R22 may have an extremely small gap therebetween.

In step S553, the conflict resolution module 430 further removes the amended first conflict region from the restriction conflict set. As described above with respect to FIG. 6, the height limitation range (i.e. the Place Keepout regions b3 and b4) corresponding to the second regions R21' and R22 almost covers the entire region e, in which no electronic component cannot be disposed, and the Place Keepout region b3 corresponding to the second region R21' does not overlap the region d, which an electronic component will be disposed. Therefore, the second region R21 (or R21') can be removed from the restriction conflict set.

In step S554, the conflict resolution module 430 further determines whether processing the restriction conflict set finishes, to decide whether to repeat the above steps S551~S553. If the conflict resolution module 430 can find out a new first conflict region from the restriction conflict set and a new second conflict region from the first conflict region, the above steps will be repeated to amend the edge of the new first conflict region until the entire restriction conflict set has been processed.

In this embodiment, in step S551, the second conflict region selected by the conflict resolution module 430 from the first conflict region is smaller than only the first conflict region. As shown in FIG. 7B, the conflict resolution module 430 may select the second region R204, which has the maximum size, among the second regions R204, R205 and R206 in the restriction conflict set and set it as a first conflict region; and then the conflict resolution module 430 may survey the first conflict region from outside to inside and select the second region R205, which has the middle size, to be a second conflict region for the follow-up steps S552~S554. That is, the first conflict region R204 is currently a region surrounded by the outermost circle A, and the second conflict region R205 is currently a region surrounded by the secondly-outer circle B.

In another embodiment, the second conflict regions are separated from each other. As shown in FIG. 7A, because one of the second regions R208 and R209 is not inside and is separated from the other one of the second regions R208 and R209, the conflict resolution module 430 may select the second regions R202 and the R203 at the same time to be second conflict regions after the conflict resolution module 430 chooses the second region R201 having the maximum size to be a first conflict region. After that, steps S552~S554 are performed. That is, the first conflict region R201 is currently a region surrounded by the outermost circle C, and the second conflict regions R202 and R203 are currently two regions surrounded by two secondly-outer circles D, respectively.

In yet another embodiment, the edges of the second conflict regions have one or more injunctions therebetween. As shown in FIG. 7C, after the conflict resolution module 430 selects the second region R207 having the maximum size to be a first conflict region, the conflict resolution module 430 may select the second regions R208 and R209 to be second conflict regions at the same time since one of the second regions R208 and R209 is not inside the other one of the second regions R208 and R209 and the edges of the second regions R208 and R209 have one or more injunctions therebetween. After that, steps S552~S554 are performed. In other words, the first conflict region R207 is currently a region surrounded by the outermost circle E, and the second conflict regions R208 and R209 are currently two regions surrounded by two secondly-outer circle F, respectively.

In this embodiment, the edge of the first conflict region and the edge of the at least one second conflict region selected by the conflict resolution module 430 in step S551 have no injunction, as shown in FIG. 6 and FIG. 7A~7C.

Figure 9:
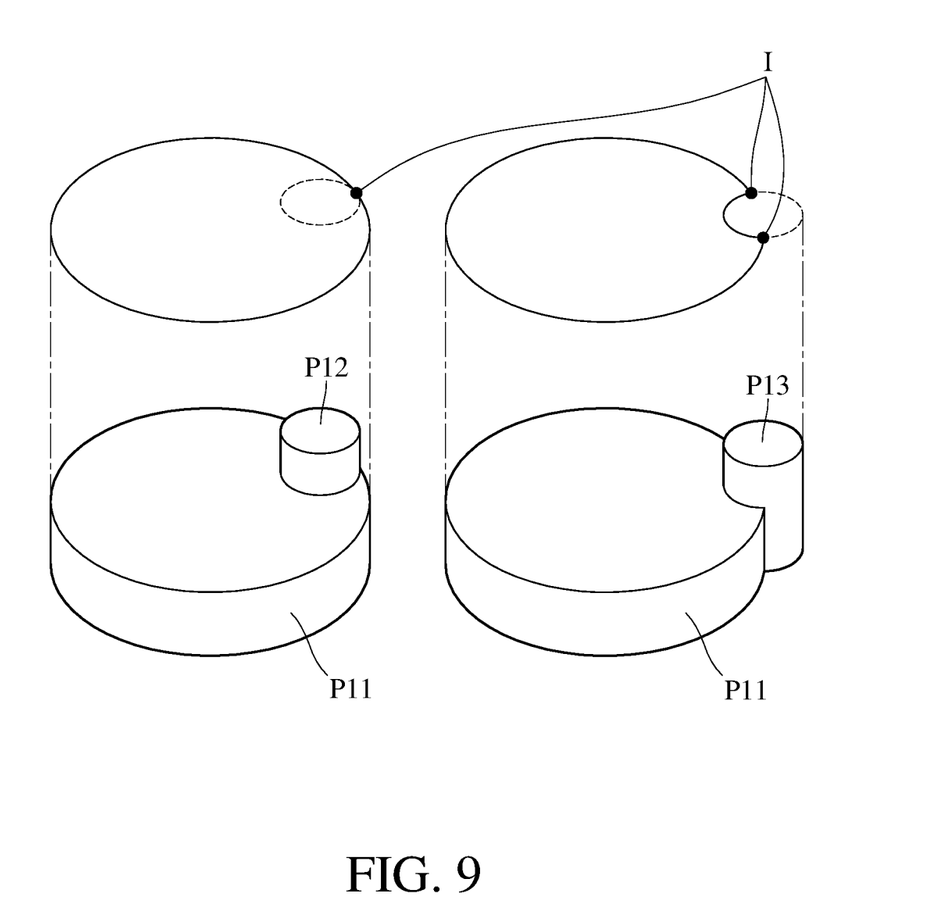
FIG. 9 schematically illustrates that the edges of the projections of the physical restricted regions have injunctions in an embodiment.

FIG. 9 schematically illustrates that the edges of the projections of the physical restricted regions have injunctions in an embodiment. In FIG. 9, the edges of the second regions (i.e. projections) corresponding to the physical restricted regions P11 and P12 have an injunction I therebetween, and the edges of the second regions (i.e. the projections) corresponding to the physical restricted regions P11 and P13 also have injunctions I therebetween.

In this embodiment, in step S551, when the conflict resolution module 430 determines that the edges of two second regions in the restriction conflict set have one or more injunctions I, the two second regions having one or more injunctions I therebetween will not be set as either a first conflict region or a second conflict region for the follow-up steps.

As set forth above, the disclosure uses the projections of physical restricted regions on the surface of the printed circuit board to define second regions, and one by one selects the outermost second region (i.e. the above first conflict region) and the secondly-outer second region (i.e. the above second conflict region) from a restriction conflict set in which one or more overlaps exist, but the disclosure sets each pair of two second regions overlapping each other to be the related first and second conflict regions. Then, the disclosure amends the selected second regions to remove any overlap from the selected second regions. Therefore, the disclosure may automatically remove one or more conflict regions from a region in which an electronic component will be disposed.

What is claimed is:

1. A restricted region transform method, comprising:
   reading out bare board information of a printed circuit board and layout information of a plurality of components, wherein the layout information of the plurality of components corresponds to a plurality of physical restricted regions;
   setting a first region according to edge information in the bare board information;
   setting a plurality of second regions according to projections of the plurality of physical restricted regions on a surface of the printed circuit board;
   selecting overlapped second regions of the plurality of second regions and setting the selected second regions as a restriction conflict set; and
   selectively amending the second regions in the restriction conflict set to remove one or more overlaps between the second regions in the restriction conflict set.

2. The restricted region transform method according to claim 1, wherein selectively amending the second regions in the restriction conflict set to remove the one or more overlaps between the second regions in the restriction conflict set comprises repeating steps of:
   selecting a first conflict region from the second regions in the restriction conflict set and selecting at least one second conflict region in the first conflict region;
   amending a regional edge of the first conflict region to become an inwardly-shrunk edge, which comprises an outer edge, an inner edge and a bridge edge connecting the outer edge to the inner edge, wherein the outer edge is a part of the regional edge of the first conflict region that has not been amended, and the inner edge is next to and is outside a regional edge of the at least one second conflict region; and
   removing the first conflict region that is amended, from the restriction conflict set.

3. The restricted region transform method according to claim 2, wherein in the first conflict region, the at least one second conflict region is smaller than the first conflict region merely.

4. The restricted region transform method according to claim 3, wherein the regional edge of the first conflict region does not interact with the regional edge of the at least one second conflict region.

5. The restricted region transform method according to claim 4, wherein when an amount of the at least one second conflict region is more than one, the second conflict regions are separated from each other.

6. The restricted region transform method according to claim 4, wherein when an amount of the at least one second conflict region is more than one, the regional edges of the second conflict regions have a junction therebetween.

7. The restricted region transform method according to claim 1, wherein after the second regions in the restriction conflict set are selectively amended to remove the one or more overlaps between the second regions in the restriction conflict set, the restricted region transform method further comprises:
   combining the first region and the plurality of second regions into an ECAD restricted region.

8. A restricted region transform device, comprising:
   an information capturing module configured to read out bare board information of a printed circuit board and layout information of a plurality of components, wherein the layout information of the plurality of components corresponds to a plurality of physical restricted regions;
   a region setting module coupled to the information capturing module and configured to set a first region according to edge information in the bare board information and set a plurality of second regions according to projections of the plurality of physical restricted regions on a surface of the printed circuit board; and
   a conflict resolution module coupled to the region setting module and configured to select overlapped second regions of the plurality of second regions and set the selected second regions as a restriction conflict set, and configured to selectively amend the second regions in the restriction conflict set to remove one or more overlaps between the second regions in the restriction conflict set.

9. The restricted region transform device according to claim 8, wherein the conflict resolution module repeats steps of selecting a first conflict region from the second regions in the restriction conflict set and at least one second conflict region from the first conflict region, amending a regional edge of the first conflict region to become an inwardly-shrunk edge, and removing the first conflict region that is amended, from the restriction conflict set; and
   wherein the inwardly-shrunk edge comprises an outer edge, an inner edge and a bridge edge connecting the outer edge to the inner edge, the outer edge is a part of the regional edge of the first conflict region that has not been amended, and the inner edge is next to and is outside a regional edge of the at least one second conflict region.

10. The restricted region transform device according to claim 9, wherein in the first conflict region, the at least one second conflict region is smaller than the first conflict region merely.

* * * * *